(12) United States Patent  
Byrne (10) Patent No.: US 10,362,163 B2
(45) Date of Patent: Jul. 23, 2019

(54) METHOD, APPARATUS, AND SYSTEM FOR PREVENTING UNINTENTIONAL COMMUNICATION

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 10 days.

(21) Appl. No.: 15/345,930

(22) Filed: Nov. 8, 2016

(65) Prior Publication Data

US 2018/0131805 A1    May 10, 2018

(51) Int. Cl.
*H04W 4/16*    (2009.01)
*H04M 1/725*    (2006.01)
*H04M 1/2745*    (2006.01)

(52) U.S. Cl.
CPC .  *H04M 1/72577* (2013.01); *H04M 1/274508* (2013.01); *H04W 4/16* (2013.01)

(58) Field of Classification Search
CPC .................................. H04W 4/14; H04W 4/12
USPC ........................................................ 455/466
See application file for complete search history.

(56) References Cited

U.S. PATENT DOCUMENTS

| 2004/0154022 A1* | 8/2004 | Boss ..................... G06Q 10/107 719/310 |
| 2011/0070870 A1* | 3/2011 | Flynn ..................... H04M 1/663 455/414.1 |
| 2013/0097527 A1* | 4/2013 | Scott ..................... G06Q 10/107 715/752 |
| 2014/0172988 A1* | 6/2014 | Baldwin .................. H04L 51/12 709/206 |
| 2014/0258398 A1 | 9/2014 | Kurupacheril et al. |
| 2015/0052127 A1* | 2/2015 | Welch ............... G06F 17/30705 707/727 |

(Continued)

FOREIGN PATENT DOCUMENTS

| JP | 2004297325 | 10/2004 |
| JP | 2006309365 | 11/2006 |

OTHER PUBLICATIONS

Perlow et al., "Official Gmail Blog: New in Labs: Stop sending mail you later regret," retrieved at <<https://gmail.googleblog.com/2008/10/new-in-labs-stop-sending-mail-you-later.html>> Oct. 6, 2008, 3 pages.

(Continued)

*Primary Examiner* — Lester G Kincaid
*Assistant Examiner* — Frank E Donado
(74) *Attorney, Agent, or Firm* — Lee & Hayes, P.C.

(57) ABSTRACT

A method, apparatus, and system discussed herein are directed to a computing device, or a user equipment (UE), for preventing unintentional communication. After a user enters a command to send a communication such as a text or email message or a phone call, to a particular recipient addressed in the communication, appropriateness of the communication for the particular recipient is evaluated based on the time of the communication and/or a comparison of the contexts of the communication against the particular recipient. If a questionable context for the particular recipient is found, the user is notified and provided with an opportunity to cancel or edit before the message is actually sent.

20 Claims, 5 Drawing Sheets

(56) References Cited

U.S. PATENT DOCUMENTS

| | | | |
|---|---|---|---|
| 2015/0057035 A1* | 2/2015 | Somekh | H04W 4/12 |
| | | | 455/466 |
| 2015/0074189 A1* | 3/2015 | Cox | H04L 12/1822 |
| | | | 709/204 |
| 2015/0312197 A1 | 10/2015 | Dong et al. | |
| 2016/0191444 A1* | 6/2016 | Penilla | H04W 4/12 |
| | | | 709/206 |
| 2017/0026328 A1* | 1/2017 | Adkins | H04L 51/12 |
| 2017/0034099 A1* | 2/2017 | Nesbitt | H04L 51/22 |
| 2017/0053509 A1* | 2/2017 | Mangum | G08B 21/0269 |

OTHER PUBLICATIONS

PCT Search Report and Written Opinion dated Mar. 5, 2018 for PCT Application No. PCT/US17/59368, 11 pages.

\* cited by examiner

METHOD, APPARATUS, AND SYSTEM FOR PREVENTING UNINTENTIONAL COMMUNICATION

BACKGROUND

Modern telecommunication systems include landline telephone systems, Internet, Wi-Fi™, and heterogeneous mixtures of second, third, and fourth generation (2G, 3G, and 4G) cellular-wireless access technologies, all of which can be cross-compatible and can operate collectively to provide voice and/or data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

Modern computing devices such as cellular phones, desktop and laptop computers, tablets, and the like, operating in such telecommunication systems are generally capable of operating in various communication modes, such as voice call, email, texting, instant messaging, photo sharing, and the like, and may even have several identities or accounts used for each mode. In such a device, each communication mode may have its own address book, which may contain contact information, such as telephone numbers and email address of friends, family, co-workers, stores and businesses, and the like, and some address books may allow a user of the computing device to combine various addresses under one entry. There may also be similar or the same name entries in the address for different individuals.

As a user of the computing device prepares a new communication, a new email for example, he may unintentionally select and include a recipient who may not be appropriate for the communication, especially considering that many of the modern devices may suggest and/or auto-fill the recipient information from the address books which may contain a similar or the same name for different individuals.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A method, apparatus, and system discussed herein are directed to a computing device, or a user equipment (UE), for preventing unintentional communication. Computing devices may include personal computers such as desktop, laptop, and tablet computers, and personal communication devices such as cellular phones, personal digital assistances, and the like. Appropriateness of an electronic communication initiated by a user is evaluated based on comparing the contexts of the communication and a recipient of the communication before the communication is transmitted, and the user is provided with an opportunity to cancel or edit the communication. The electronic communication may include, a phone call, Short Message System (SMS) message or text message, email, instant message (IM), social media message, and the like, and may be interchangeably referred to as a message.

After a user enters a command to send a message such as a text or email message or a phone call, to a particular recipient addressed in the message, appropriateness of the message for the particular recipient is evaluated based on the time of the message and/or a comparison of the contexts of the message against the particular recipient, which may have been auto-filled with a name similar to the intended recipient of the message. If a questionable context for the particular recipient is found, the user is notified and provided with an opportunity to cancel or edit before the message is sent. For example, the user would be notified if a message meant for the user's loved one were unintentionally addressed to a business colleague, which may be irrelevant or even inappropriate.

The contexts of a message may include a time of the day and context categories of words or phrases used in the message. The context categories may comprise, for example, work, business, family, friends, personal, mature, and the like. Recipients may be categorized into, for example, work, family, friends, personal, unknown, and the like. The context categories are compared to the recipient categories before the message is sent, and if a mismatch is detected, the user is given an opportunity to edit or cancel the message before it is sent. For example, if the message were determined to be in the business category having a phrase "proprietary and confidential," and the recipient were determined to be in the family category such as the user's spouse, a notification or a warning may be provided to the user before the message is sent. The user may then edit the message or the recipients before sending it or cancel the message. The context and recipient categories may be pre-installed in the computing device and/or be created by the user, and the user may make entries to each of the categories.

The user may select recipients first, then create a message. As discussed above, some of the recipients may be auto-filled and may not be the intended recipients. As the user creates a message and enters inappropriate words or phrases for the selected recipient, the user may be notified. The user may ignore the notice or edit the message. When the user completes creating the message and selects to send it, the context categories may be compared to the recipient categories before the message is sent, and if a mismatch is detected, the user may be given another opportunity to edit the message before it is sent.

Alternatively, the user may create a message first, or select to forward an existing message, then select the recipients. Some of the recipients may be auto-filled and may not be the intended recipient. As each recipient is selected, the context categories are compared to the recipient category of the recipient just added, and if a mismatch is detected, the user may be warned and given an opportunity to edit the message or the recipient. The user may ignore the warning or edit the message based on the warning. When the user selects to send the message, the context categories may be compared to the recipient categories before the message is sent, and if a mismatch is detected, the user may be given another opportunity to edit the message before it is sent.

Figure 1:
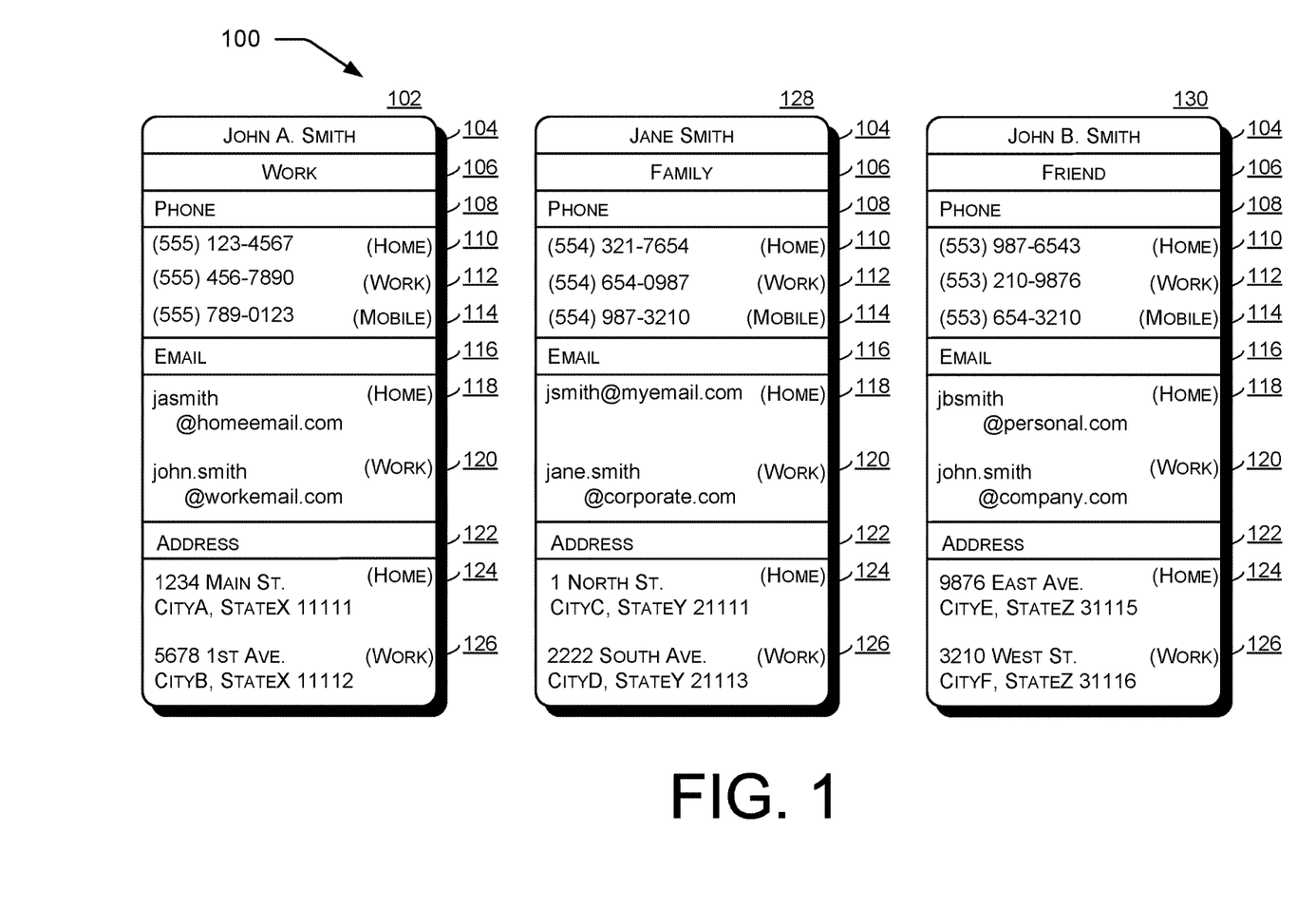
FIG. 1 illustrates an example address book entries which may be utilized by a method, apparatus, and system for preventing unintentional communication.

FIG. 1 illustrates example address book entries 100, which may be utilized by a method, apparatus, and system for preventing unintentional communication. A contact entry 102 may include various fields such as a name field 104 for the name of the individual, a recipient category field 106 for the relationship of the individual to the user, and contact information. The contact information for the associated individual may include a phone number field 108 for phone numbers such as home number 110, work number 112, and/or mobile number 114, an email field 116 for email addresses such as home email address 118 and/or work email address 120, and an address filed 122 for work address 124 and home address 126. The contact entry 102 shows that it is for "John A. Smith" as shown in the name field 104, and his relationship to the user is "work" as shown in the recipient category field 106. Because the relationship of John A. Smith to the user is work related, work related information, such as the work phone number 112 and the work email address 120, from the contact entry 128 may be selected by default.

Similarly, a contact entry 128 shows that it is for Jane Smith as shown in the name field 104, and her relationship to the user is "family" as shown in the recipient category field 106. Because the relationship of Jane Smith to the user is family, family information, such as the home phone number 110 and the home email address 118, from the contact entry 102 may be selected by default. Another contact entry 130 shows that it is for John B. Smith as shown in the name field 104, and her relationship to the user is "friend" as shown in the recipient category field 106. Because the relationship of John B. Smith to the user is friend, the use may assign the mobile phone number 110 and the home email address 118 as default from the contact entry 130. An address book for the contact entries, such as 102, 128, and 130, may be, or may be based on, a corporate directory, a personal directory in the user's computing device, an external personal directory maintained by a network service provider, a public record such as a phonebook, and the like.

Figure 2:
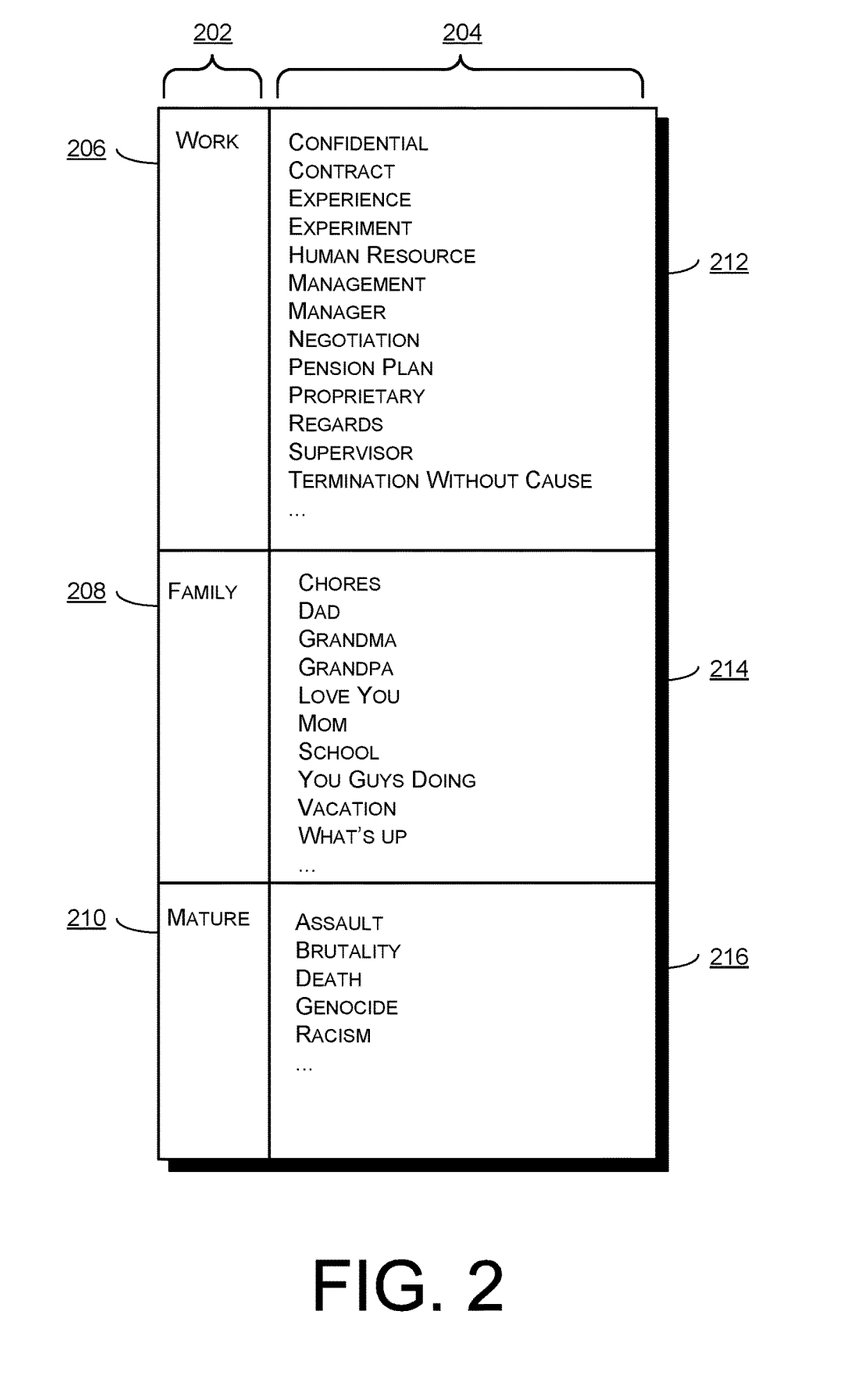
FIG. 2 illustrates an example list of context categories and associated entries which may be utilized by a method, apparatus, and system for preventing unintentional communication.

FIG. 2 illustrates an example context list 200 of context categories 202 and associated context entries 204 which may be utilized by a method, apparatus, and system for preventing unintentional communication. In the context list 200, three context categories, work 206, family 208, and mature 210 are shown under the context categories 202. Other categories may be created by the user. Under the context entries, work contexts 212, family contexts 214, and mature contexts 216 are shown. These entries may be made by the user, and some words and phrases may be entered under multiple context categories. For example, if the user's work were related to greeting cards, then the phrase "love you" in the family contexts 214 may be equally applicable for the work contexts 212. Similarly, if the user's work were related to legal or police work, the entries in the mature contexts 216 may be equally applicable for the work contexts 210. Other words and phrases may be applicable for the work context 212, the family context 214, and a friend context (not shown).

Figure 3:
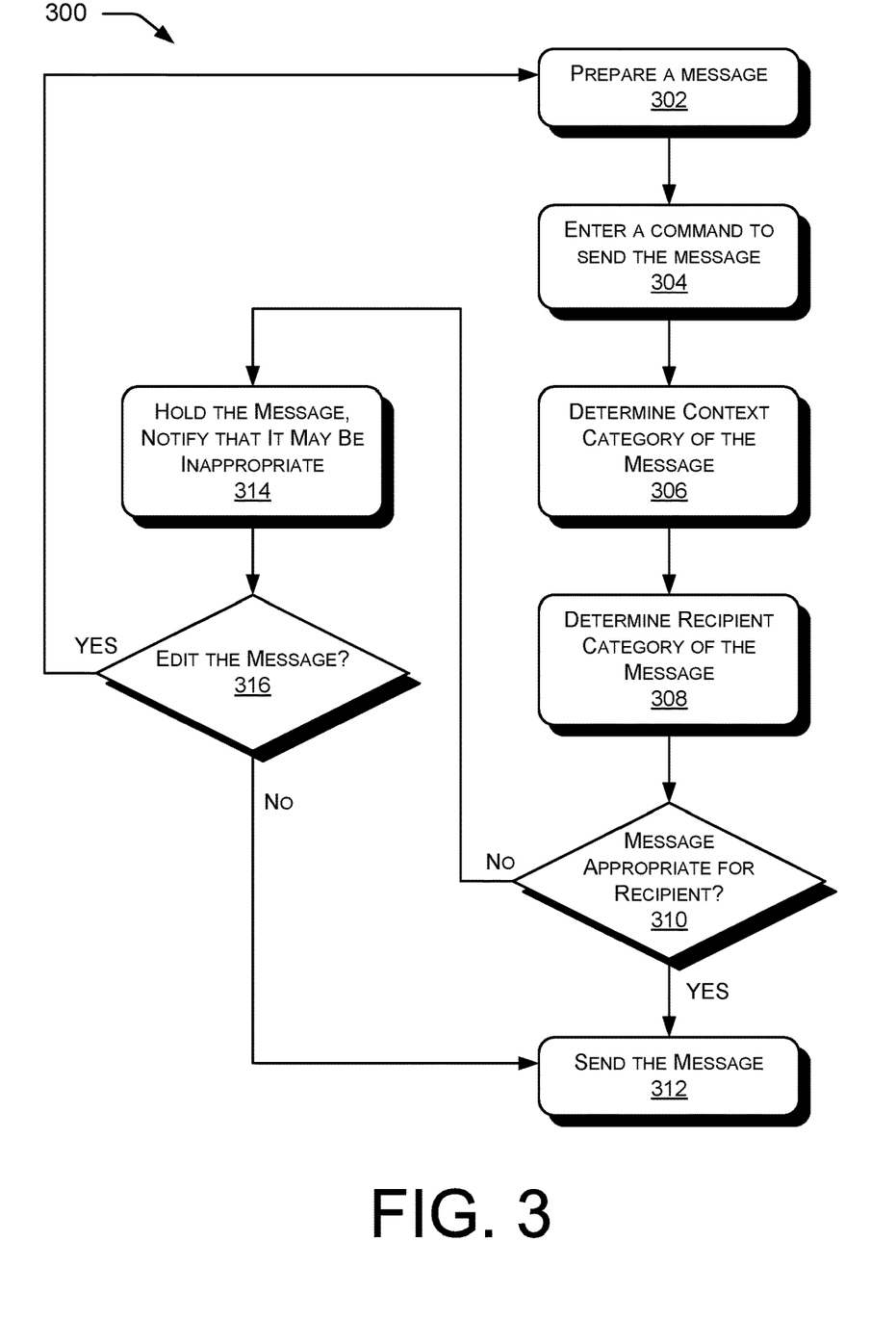
FIG. 3 illustrates an example process for preventing unintentional communication.

FIG. 3 illustrates an example process 300 for preventing unintentional communication. In block 302, the user may prepare a message, an email message for example, by completing the body of the message and one or more recipients for the message, and may enter a command to send the message in block 304. In block 306, a context category of the message may be determined based on finding any context entries, such as those listed in the work contexts 212, family contexts 214, and mature contexts 216, in the message including the subject and the body of the message. If found, a context category corresponding to the context entry may be assigned to the message. In block 308, a recipient category of each of one or more recipients may be determined based on the relationship of each recipient to the user as indicated in the recipient category field 106.

In block 310, appropriateness of the message for each recipient may be determined by comparing the context category to the recipient category as determined in blocks 304 and 306, respectively. The message may be determined to be appropriate if the context category matched the recipient category or user-assigned recipient category/categories. For example a work-category message would be appropriate for a work-category recipient but it would not be appropriate for a family-category recipient. A family-category message may be appropriate for both a family-category recipient and a friend-category recipient. If the message were determined to be appropriate for the recipient in block 310, then the message may be sent to the recipient in block 312.

If the message were determine not to be appropriate for at least one of the recipients in block 310, then the message may be halted and a notice may be provided to the user, notifying that the message may not be appropriate for the recipient in block 314. In block 316, the user may select to edit the message and/or the recipient, or select not to edit the message and confirm to send the message. If the user selects not to edit and confirms to send the message, the message may be sent in block 312. If the user selects to edit the message, then the process may loop back to block 302. As shown in FIG. 1, the contact entries may include similarly named individuals, each having a different relationship with the user, and the user may unintentionally select an unintended recipient. With an auto-fill feature, the user may easily select an unintended recipient from a list suggested by the computing device.

Figure 4:
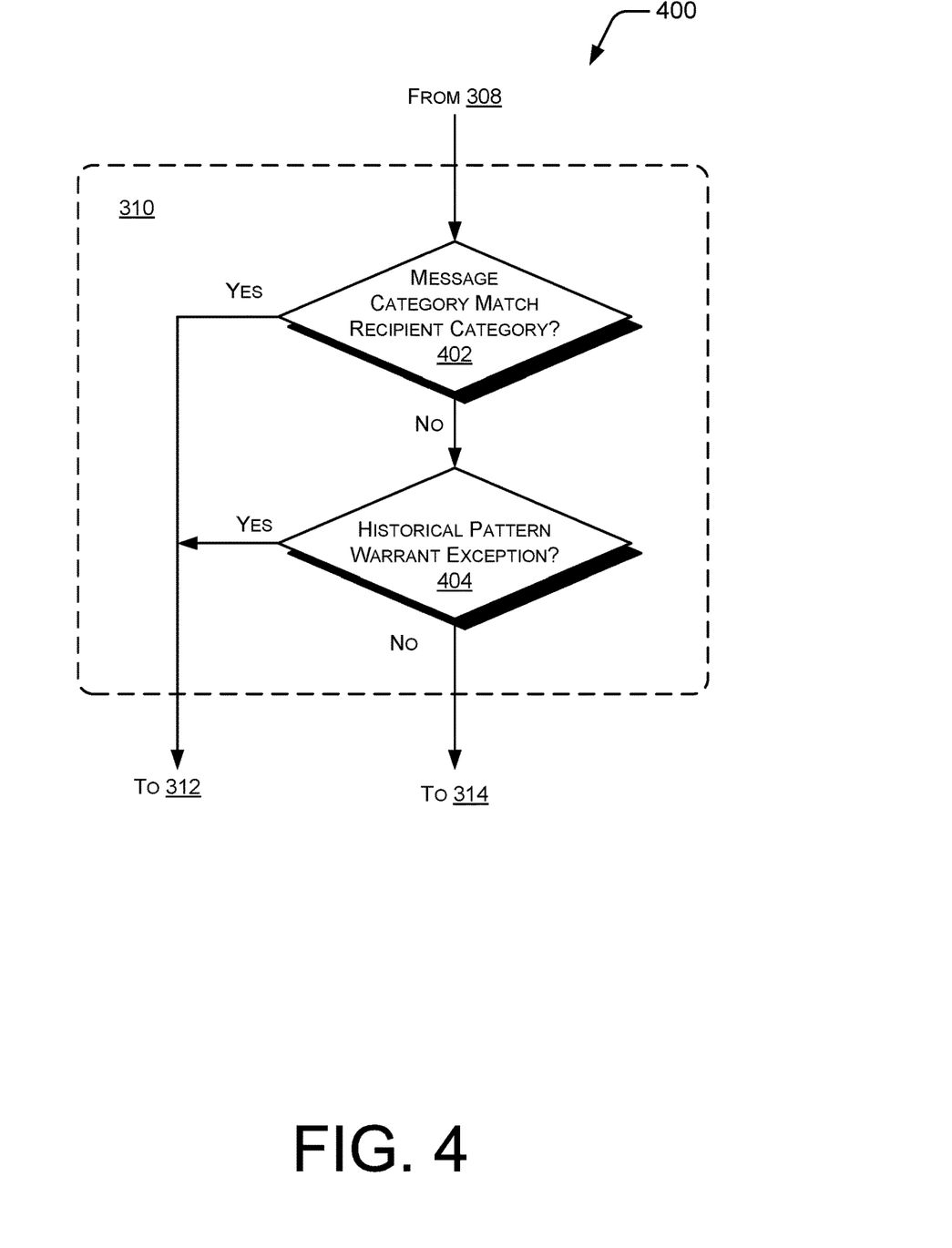
FIG. 4 illustrates an example process detailing one of the blocks of FIG. 3.

FIG. 4 illustrates an example process 400 detailing block 310 of FIG. 3. In block 402, whether the message category matches the recipient category may be determined, and if they match, the process may proceed to block 312 and the message may be sent. If they do not match, a historical pattern of the pairing of this particular message category, or the context entry in the particular message category, with the recipient, not the recipient category, may be evaluated in block 404 to determine whether an exception is warranted. For example, the user may frequently use "love you," which is one of the family context 214 listed under the family context category 208, in messages to his co-worker John A. Smith whose contact information is shown in the contact entry 102. Normally, a use of a family context in a work category message may cause a notification, however, if the user and John A. Smith worked for the same greeting card company and it were a normal part of their business to use the phrase "love you," the user may wish to suppress the notice. Yet, the user may not wish to enter "love you" under the work category. By evaluating how often this particular paring, "love you" with the co-worker John A. Smith occurred, and determining how often the user selected to ignore the notice of this paring, the pairing of "love you" with John A. Smith may be determined to be appropriate. A predestined number of the pairing occurrences, or a percentage of overruling or ignoring the notice of inappropriateness of the pairing may be set, and above which the paring may be presumed to be appropriate and the notice may no longer be provided for the pairing. If it is determined that an exception is warranted in block 404, the process may proceed to block 312 and the message may be sent. If the historical patter does not warrant an exception, the process proceeds to block 314.

Figure 5:
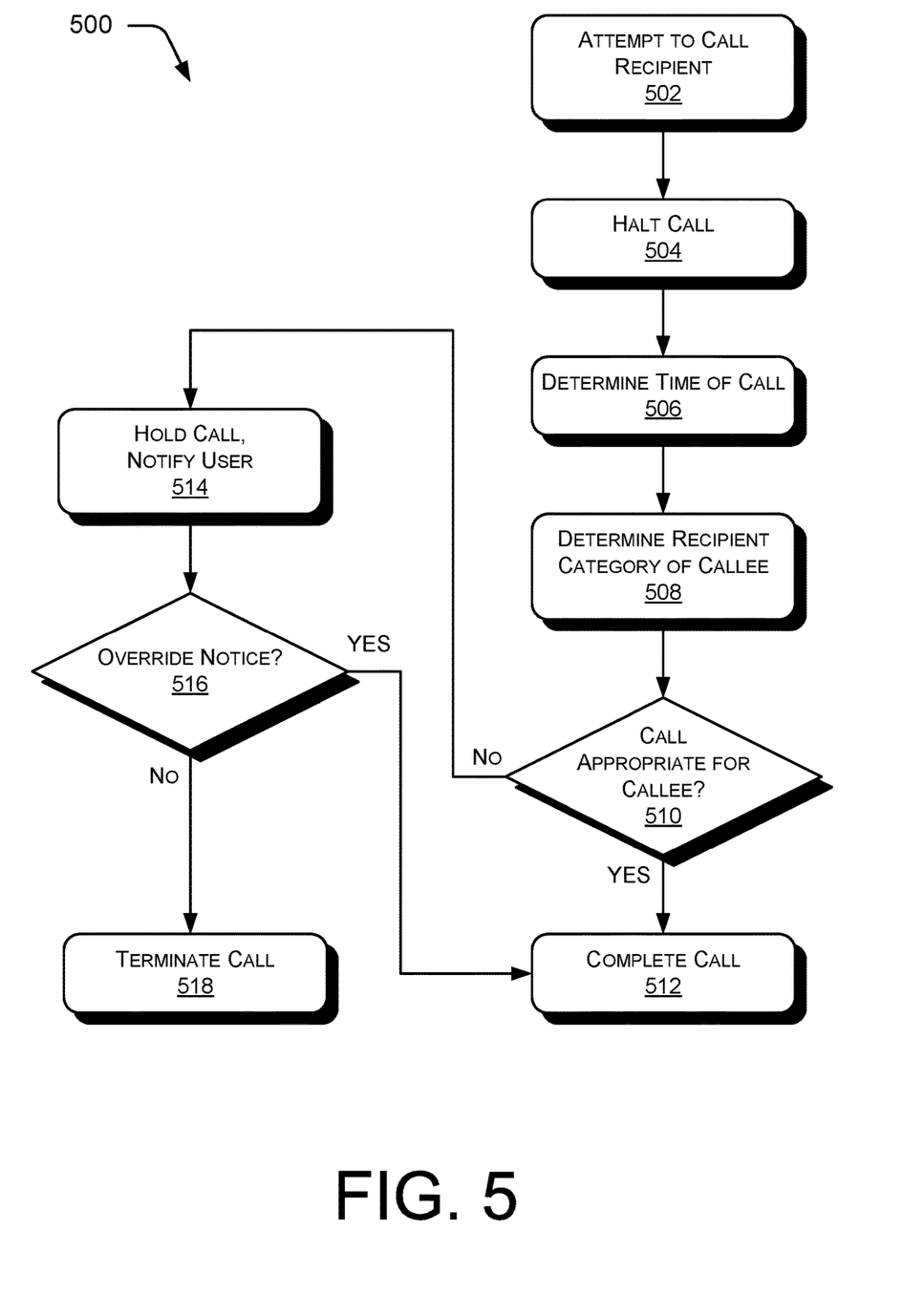
FIG. 5 illustrates another example process for preventing unintentional communication.

FIG. 5 illustrates another example process 500 for preventing unintentional communication. In block 502, the user accidentally, or intentionally, may attempt to make a phone call to a callee. A completion of the phone call may be halted in block 504, and the time of day of the phone call initiation may be determined in block 506. In block 508, a recipient category of the callee may be determined, and appropriateness of the phone call may be evaluated in block 510. If the phone call were determined to be appropriate in block 510, then the process may proceed to block 512 and the phone call may be completed. However, if the phone call were determined to be inappropriate in block 510, the phone call may be halted and a notice may be issued to the user in block 514. If the user overrides the notice in 516, the telephone call may be completed in block 512. If the user does not override the notice in 516, the telephone call may be terminated in block 518.

For example, a telephone call at 8 pm to a callee who is under the friend recipient category may be appropriate, but to a callee who is under the work recipient category may be inappropriate. However, a telephone call at 8 pm to a callee who is under the work recipient category, but based on the contact entry information, known to be currently in the business hours, may be appropriate.

Some or all operations of the methods described above can be performed by execution of computer-readable instructions stored on a non-transitory computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

The non-transitory computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more computer storage media that, when executed by one or more processors, perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a computing device of a user for preventing unintentional communication, the method comprising:
   receiving, by the computing device, a plurality of user-defined context categories;
   determining, by the computing device, a context category, from the plurality of user-defined context categories, of a word or a phrase of a message, the message having been prepared by the user;
   determining, by the computing device, a recipient category of a recipient of the message, the recipient having been selected by the user;
   determining, by the computing device, that the context category is unassociated with the recipient category by:
      determining a number of previous occurrences of a previous message having the context category being sent to the recipient of the message;
      determining an overriding number, wherein the overriding number is a number of times out of the number of previous occurrences when the context category is found to be associated with the recipient; and
      determining that the context category is unassociated with the recipient category when the overriding number is less than a predetermined number; and
   providing, by the computing device and prior to sending the message to the recipient, a notification indicative of the context category being unassociated with the recipient category.

2. A method of claim 1, wherein the context category is associated with at least one of:
   a range of time of a day when the message is created, or
   a range of time of a day when the message is requested to be sent.

3. A method of claim 2, wherein determining the context category of the word or the phrase of the message is based on determining that the word or the phrase of the message was previously associated with the context category.

4. A method of claim 1, wherein the recipient category of the recipient is one of a plurality of recipient categories, wherein each of the plurality of recipient categories is a user defined category associated with a user selected recipient in an address book accessible by the computing device.

5. A method of claim 4, wherein determining the recipient category of the recipient is based on determining that the recipient category includes the recipient of the message.

6. A method of claim 1, wherein determining that the context category is unassociated with the recipient category is based upon a user-defined association of the context category with one or more recipient categories.

7. A method of claim 6, wherein determining that the context category is unassociated with the recipient category is based at least in part on a determination that a number of previous occurrences of the context category being associated with the recipient of the message is less than a predetermined number and the method further comprises refraining from sending the message in response to determining that the context category is unassociated with the recipient category.

8. A method of claim 1, wherein providing the notification indicative of the context category being unassociated with the recipient category comprises:
 receiving an instruction to send the message;
 refraining from sending the message;
 providing the notification; and
 sending the message upon receiving a confirmation to send the message.

9. A method of claim 1, wherein determining the context category of the word or the phrase of the message is performed without receiving an indication of the context category from a user.

10. A method of claim 1, wherein determining that the context category is unassociated with the recipient category comprises:
 determining that the context category is at least one of a work-category, a home-category, or a friend-category; and
 determining that the recipient category of the recipient does not match the context category.

11. A computing device configured to prevent unintentional communication, the computing device comprising:
 one or more processors; and
 memory coupled to the one or more processors, the memory storing computer-readable instructions that when executed by the one or more processors, cause the computing device to perform operations comprising:
  determining a context category of a message, the message having been prepared on the computing device;
  determining a recipient category of a recipient of the message, the recipient having been selected on the computing device;
  determining that the context category is unassociated with the recipient category based upon a user-defined association of the context category with one or more recipient categories, the determining that the context category is unassociated with the recipient category including:
   determining a number of previous occurrences of a previous message having the context category being sent to the recipient of the message;
   determining an overriding number, wherein the overriding number is a number of times out of the number of previous occurrences when the context category is found to be associated with the recipient; and
   determining that the context category is unassociated with the recipient category when the overriding number is less than a predetermined number;
  refraining from sending the message in response to determining that the context category is unassociated with the recipient category;
  providing a notification indicative of the context category being unassociated with the recipient category;
  receiving confirmation from a user to send the message while the context category is unassociated with the recipient category; and
 sending the message in response to receiving the confirmation.

12. A computing device of claim 11, wherein the context category of the message is one of a plurality of context categories, wherein each of the plurality of context categories is a user defined category associated with at least one of:
 a user selected word,
 a user selected phrase,
 a range of time of a day when the message is created, or
 a range of time of a day when the message is requested to be sent.

13. A computing device of claim 12, wherein determining the recipient category of the recipient is based on determining that the recipient category includes the recipient of the message.

14. A computing device of claim 11, wherein the recipient category of the recipient is one of a plurality of recipient categories, wherein each of the plurality of recipient categories is a user defined category associated with a user selected recipient in an address book accessible by the computing device.

15. A computing device of claim 14, wherein determining the context category of the message is based on determining that the context category includes a context of the message.

16. A non-transitory computer storage medium configured to store computer-readable instructions that when executed by a computer, cause the computer to perform operations comprising:
 determining a context category of a message based on the context category including a context of the message, the context category of the message being one of a plurality of user defined context categories and the message having been prepared on the computer;
 determining a recipient category of a recipient of the message, the recipient category being one of a plurality of recipient categories, each of the plurality of recipient categories being a user defined category associated with a user selected recipient in an address book accessible by the computer;
 determining that the context category is unassociated with the recipient category based upon a user-defined association of the context category with one or more of the recipient categories, the determining that the context category is unassociated with the recipient category including:
  determining a number of previous occurrences of a previous message having the context category being sent to the recipient of the message;
  determining an overriding number, wherein the overriding number is a number of times out of the number of previous occurrences when the context category is found to be associated with the recipient: and
  determining that the context category is unassociated with the recipient category when the overriding number is less than a predetermined number;

refraining from sending the message in response to determining that the context category is unassociated with the recipient category; and providing, prior to sending the message to the recipient, a notification indicative of the context category being unassociated with the recipient category.

17. A non-transitory computer storage medium of claim 16, wherein determining the recipient category of the recipient is based on determining that the recipient category includes the recipient of the message.

18. A non-transitory computer storage medium of claim 16, wherein the number of times out of the number of previous occurrences when the context category is found to be associated with the recipient is determined based on a number of times that a sender of the message overrode a previous notification indicative of the context category being unassociated with the recipient category.

19. A non-transitory computer storage medium of claim 16, wherein the overriding number is further determined based on a percentage of times that a sender of the message overrode a previous notification indicative of the context category being unassociated with the recipient category.

20. A non-transitory computer storage medium of claim 16, wherein refraining from sending the message is in response to receiving an instruction to send the message.

* * * * *